Jan. 10, 1961 P. E. REEVES 2,968,009

FREQUENCY STABLE MULTIVIBRATOR

Filed Aug. 14, 1957 2 Sheets-Sheet 1

INVENTOR.
PIERCE E. REEVES

BY John A. Duffy

AGENT

INVENTOR.
PIERCE E. REEVES
BY John A. Duffy
AGENT 2,968,009

Patented Jan. 10, 1961

2,968,009

FREQUENCY STABLE MULTIVIBRATOR

Pierce E. Reeves, Mountain View, Calif., assignor to North American Aviation, Inc.

Filed Aug. 14, 1957, Ser. No. 678,108

2 Claims. (Cl. 331—144)

This invention relates to signal generators and more particularly to a multivibrator whose frequency is controlled internally.

The need for accurate signal generators has become increasingly apparent with the continuing advance in the state of the electronics art. In particular, a signal generator is often required to meet stringent frequency stability criteria. The generator must produce an alternating current signal whose frequency remains substantially constant in accordance with predetermined adjustments. The generator, therefore, must compensate for inherent errors in the circuit elements which tend to vary the frequency of the output signal of the generator.

The use of a multivibrator to generate alternating current signals is well known. The multivibrator, or relaxation oscillator as it is often called, ordinarily includes a pair of switching devices or electronic valves which have certain of their electrodes cross-coupled to form a two stage regeneratively coupled multivibrator with one switching device conducting and the other device cut off. When the frequency of the multivibrator is controlled by its own internal circuitry, the multivibrator is said to be free-running. Upon application of the operating potentials, the switching devices of the multivibrator alternately conduct and cut off at a frequency determined by the value of the circuit elements of the multivibrator. Known multivibrators used as signal generators depend for frequency stability on the characteristics of the electronic valves and other circuit elements. The multivibrator may vary considerably in relation to temperature changes, time of operation, and other variables. The inherent errors in such a multivibrator produce a generator whose frequency stability is poor. To compensate for this frequency instability complicated circuitry is employed which usually only partially solves the frequency problem.

The device of this invention contemplates a free-running multivibrator which is maintained at a predetermined, constant frequency. An internally connected degenerative feedback circuit is employed which maintains the multivibrator frequency substantially constant. The frequency of the multivibrator does not depend on stability of power supply, valve characteristics or circuit resistances and capacitor elements but rather depends upon an inherent stable internal circuit which is self-compensating. Unlike all previous multivibrator circuits, the control electrode of the conducting valve of the multivibrator is caused to fall toward a relatively negative potential at a rate determined by the compensating circuit. The fall in potential of the control electrode of the conducting valve in turn causes a rise in potential at its corresponding output electrode which couples this rise to the control electrode of the non-conducting valve causing that valve to conduct.

The invention herein described provides a multivibrator signal of inherently stable frequency characteristics.

It is therefore an object of this invention to provide an improved multivibrator.

It is another object of this invention to provide a signal generator with improved frequency.

It is still another object of this invention to provide a frequency stable multivibrator.

It is a further object of this invention to provide a signal generator whose frequency characteristics are independent of varying circuit element characteristics.

It is a still further object of this invention to provide a signal generator whose frequency is internally controlled.

Other objects of the invention will become apparent from the following description in which.

Figure 1:
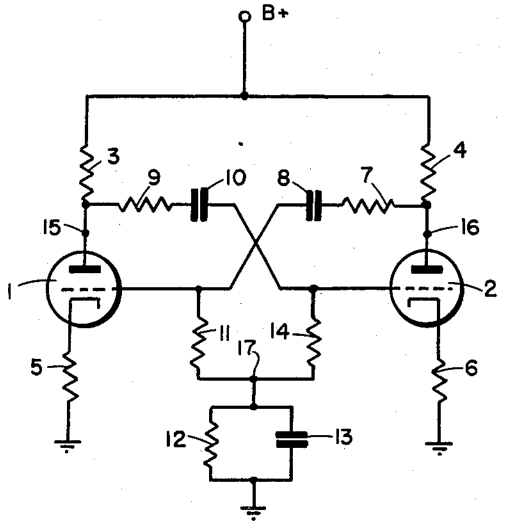
Fig. 1 is a schematic diagram of the device of this invention.

Referring to Fig. 1, the signal generator of the device in this invention is a multivibrator comprising electronic valves such as vacuum tubes 1 and 2. One output circuit electrode or plate of tubes 1 and 2 is connected through resistors 3 and 4 respectively to receive the operating potential from a B+ supply. The other output circuit electrodes, the cathodes of the tubes, are connected through resistors 5 and 6 respectively to the ground side of the B+ supply. The control electrode or grid of tube 1 is connected through capacitor 8 and resistor 7 in series to the plate of tube 2 and the grid of tube 2 is connected through capacitor 10 and resistor 9 in series to the plate of tube 1. A charge path is provided for capacitor 8 through resistor 11 and a resistor circuit having resistor 12 and capacitor 13 connected in parallel to ground. A charge path is provided for capacitor 10 through resistor 14 and the circuit of resistor 12 and capacitor 13 to ground.

The circuit comprises vacuum tubes 1 and 2 arranged in a manner so as to operate as a free-running multivibrator wherein tubes 1 and 2 are alternately conducting. The frequency of the multivibrator is substantially determined by the time constants produced by the various resistors and capacitors located in the circuits coupling the vacuum tubes. Capacitors 8 and 10 and resistors 11 and 14 are chosen to produce substantially equal time constants for the respective charge paths. Resistors 7 and 9 serve to vary the bias potential on the grids of tubes 1 and 2 during operation of the tubes by limiting the magnitude of plate to grid feedback. Resistor 12 and capacitor 13 connected as shown constitute in effect an internal degenerative frequency feedback. The resistor-capacitor circuit provides a frequency control bias potential at point 17 which varies inversely with the frequency of the multivibrator. Thus, in the embodiment shown in Fig. 1 with an increase in frequency the resistor 12, capacitor 13 circuit provides an increased positive bias at point 17 and vice versa. A decrease in frequency results in a decrease in positive bias at point 17.

In order to understand the operation of the multivibrator of Fig. 1 it is first assumed the circuit is in a state wherein tube 1 is conducting and tube 2 is non-conducting. The potential at point 15 of the plate circuit of tube 1 is comparatively negative because of high conduction through the plate-cathode circuit of tube 1 and conversely point 16 of the plate circuit of tube 2 is at a comparatively positive potential because of the high impedance presented by its non-conducting plate-cathode circuit. Capacitor 8 exponentially charges through resistor 11, the circuit comprising resistor 12 and capacitor 13, ground, B+, and resistors 4 and 7 so that the voltage at the grid of tube 1 falls from a comparative positive potential toward ground as the charging current through resistor 11 and the resistor 12 and capacitor 13 circuit decreases. As the voltage at the grid of tube 1 falls, the voltage at point 15 of the plate of tube 1 correspondingly rises. A rise in potential at point 15 is coupled through resistor 9 and capacitor 10 to the grid of tube 2 and causes conduction in tube 2, which in turn produces a further fall in the potential at point 16. The fall in potential at point 16 is coupled through resistor 7 and capacitor 8 to the grid of tube 1 cutting that tube off. The multivibrator has now completed a half cycle of operation with tube 2 now conducting and tube 1 now cut off. Capacitor 10 which was discharged during the previously described half cycle of operation now commences to charge. The charge circuit for capacitor 10 comprises resistor 14, the circuit comprising resistor 12 and capacitor 13, ground, B+, and resistors 3 and 9. As the charge current decreases the voltage at the grid of tube 2 falls from a comparative positive potential toward ground. Point 16 of the plate circuit of tube 2 correspondingly rises and this rise is coupled through resistor 7 and capacitor 8 to the grid of tube 1 causing conduction therein. The potential of point 15 now decreases and is coupled through resistor 9 and capacitor 10 to the grid of tube 2 cutting off that tube. One complete cycle of operation has now been completed with tube 1 conducting and tube 2 cut off.

The regenerative or switching action of tubes 1 and 2 of the multivibrator occurs at a frequency determined partly by the time constant of the charge paths for capacitor 10 and capacitor 8. The time it takes capacitor 8 to charge to a point where the potential coupled from point 15 to the grid of tube 2 reaches cutoff is the time of switching from tube 1 conducting to tube 2 conducting. The time it takes capacitor 10 to charge so that the potential at the grid of tube 1 reaches cutoff determines the switching time from tube 2 conducting to tube 1 conducting. In addition to capacitors 8 and 10 there is common to both of the discharge paths capacitor 13 which develops a bias voltage at point 17 common to both the discharge paths. Capacitor 13, in effect, integrates the charge of capacitors 8 and 10. This bias voltage produced by charge currents from both capacitor 8 and 10 has a direct effect on the conduction and cutoff times of the respective tubes. For example, a comparatively negative bias potential at point 17 will force the bias potential of the non-conducting tube to a further negative point and increase the rise in voltage at the grid necessary to cause the non-conducting transistor to conduct. The amount of bias voltage developed at point 17 is determined by the frequency of the charge of capacitors 8 and 10 which in turn determine the frequency of the multivibrator circuit. Thus, as the frequency of the multivibrator circuit increases capacitors 8 and 10 charge more often thereby cumulatively increasing the relatively negative charge on capacitor 13 which is chosen so at to accumulate a predetermined charge at the predetermined frequency. This charge will vary with frequency of the multivibrator. The relatively negative charge on capacitor 13 increases the negative bias voltage at point 17. The result of this action is a frequency stabilized multivibrator circuit. Resistor 7 in the coupling circuit between the plate of tube 2 to the grid of tube 1 and resistor 9 in the coupling circuit between the plate of tube 1 and the grid of tube 2 provides for the adjustment of the bias levels at the grids so that the grid of the conducting tube controls the switching action instead of the grid of the non-conducting tube as in multivibrators of the prior art. Thus, with tube 1 conducting and tube 2 non-conducting, it takes longer for the grid of tube 2 to rise to cutoff due to the discharging capacitor 10 than it does for the plate of tube 1 to rise to a potential sufficient to cause the grid of tube 2 to rise to the conducting level.

Now assume constant frequency operation of the multivibrator during the half cycle of operation when capacitor 8 is charging and a predetermined bias potential has been developed at point 17 by the integrating action of capacitor 13. This bias potential at point 17 in conjunction with the time constants of the charge path determines the rate of fall of the potential at the grid of tube 1. The time it takes the grid of tube 1 to fall to a potential which establishes the rise of point 15 potential and the rise towards cutoff of the potential of the coupled grid of tube 2 is a time proportional to the bias voltage developed at point 17, the previous half cycle of operation. Similarly when capacitor 10 is charging there is developed a bias voltage at point 17 from the previous half cycle which determines the time of conduction of tube 2 in the same manner as described for capacitor 8 charging.

Figure 2:
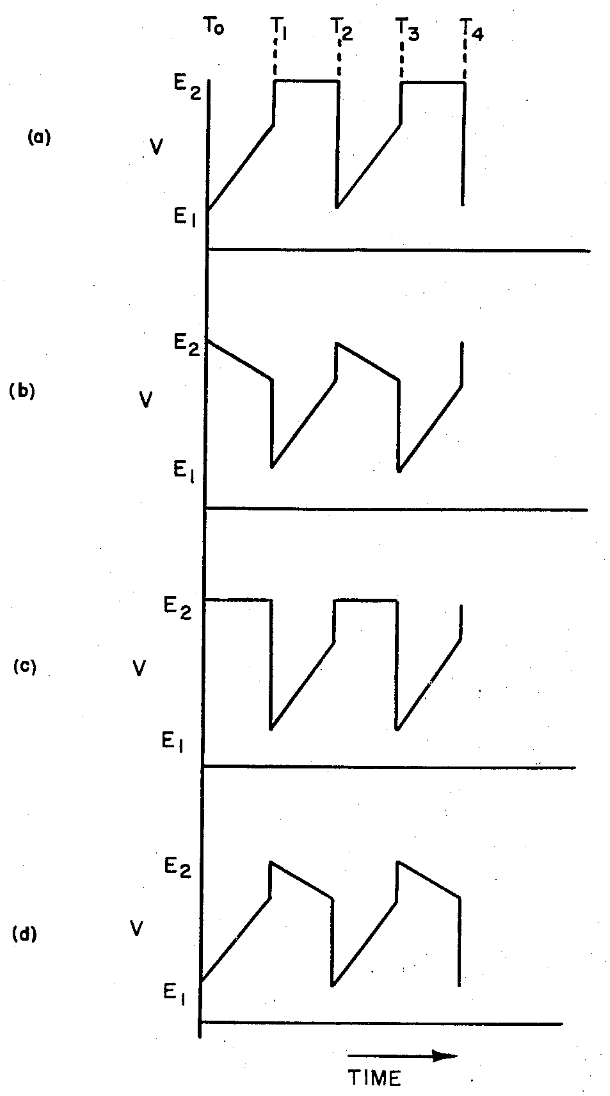
Fig. 2 is a graphical illustration of the waveforms produced at various points of the multivibrator.

Now assume that the frequency of the multivibrator tends to increase due to the change in characteristics of circuit components or power supply. With tube 2 conducting capacitor 10 charges at a certain rate and builds up a charge on capacitor 13. The charge on capacitor 13 which determines the bias potential at point 17 tends to leak off at a certain predetermined rate. However, due to the increase in frequency of the multivibrator circuit, capacitor 8 on the second half cycle commences to charge sooner than it would at the predetermined frequency of the multivibrator circuit. Thus, the charge on capacitor 13 does not have enough time to leak off in order to produce the predetermined bias voltage at point 17 and therefore the potential at point 17 increases in positive sense. The increase in the positive bias potential at point 17 now causes the grid of conducting tube 1 to fall toward a more positive potential than the predetermined potential. In effect, the rate of fall of the grid of tube 1 is decreased by such increase of potential at point 17. This increases the time necessary for the potential of the grid of the conducting tube 1 to fall to a point which will cause a corresponding rise in potential of the plate of tube 1 in order to cause a rise in potential of the grid of tube 2 to the conducting level. The time necessary to cause the non-conducting tube 2 to conduct is increased thereby tending to decrease the frequency of operation of the multivibrator. As the frequency of the multivibrator decreases, a negative increment of bias potential develops at point 17 which tends to stem the decrease in frequency of the multivibrator. Thus, it can be seen that the frequency of the multivibrator is stabilized at a predetermined frequency and any increase or decrease in frequency will be compensated for by the developing of a compensating increment of bias potential at point 17. Thus, a circuit has been described in which the change in frequency of a multivibrator has been compensated by inserting a degenerative feedback circuit which produces a bias potential in the grid circuits of the tubes which is inversely proportional to a change in potentials developed by changing characteristics of the circuitry. The variations in circuit characteristics are cancelled by the compensating circuit. Referring to Fig. 2, waveforms are shown which illustrate the potentials at various points in the multivibrator circuit during operation. Fig. 2(*a*) indicates the potential at the plate of tube 1; Fig. 2(*b*) indicates the potential at the grid of tube 1; Fig. 2(*c*) indicates the potential at the plate of tube 2; and Fig. 2(*d*) indicates the potential at the grid of tube 2. In tracing the operation of the circuit it will be assumed that no change in frequency is occurring. At time $T_0$ tube 1 is conducting with its plate potential at relatively negative potential $E_1$ (Fig. 2*a*) and its grid potential at relatively positive potential $E_2$ (Fig. 2*b*), and tube 2 is non-conducting with its plate potential at $E_2$ (Fig. 2*c*) and its grid potential at $E_1$ (Fig. 2*d*). The grid potential of tube 1 commences to fall at a rate determined by the changing circuit through capacitor 8 and the plate potential rises (Fig. 2*a*) correspondingly until time $T_1$ when the rise in plate potential of tube 1 is sufficient to cause the potential of the coupled grid of tube 2 (Fig.

2*d*) to rise to cutoff at which time a switching action occurs with tube 2 conducting and tube 1 cut off. This condition remains until time $T_2$ when the potential of the plate of tube 2 coupled to the grid of tube 1 causes tube 1 to conduct and tube 2 to cut off, thus completing the cycle. The switching action continues as shown through times $T_3$ and $T_4$.

Figure 3:
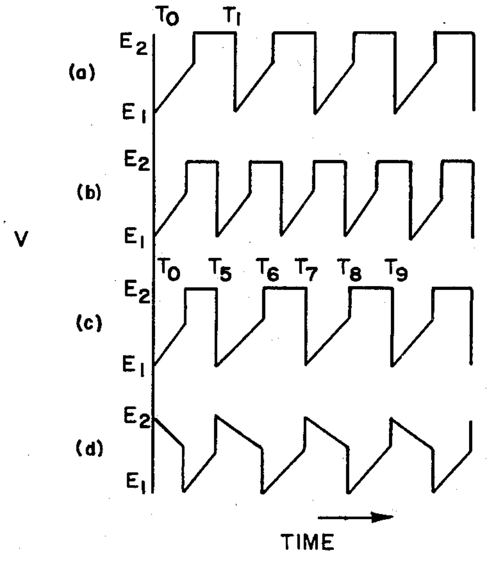
Fig. 3 is a graphical illustration of the waveforms showing in particular the frequency compensation action of the device.

Referring now to Fig. 3, graphical illustrations are shown which illustrate the frequency stability produced by the degenerative feedback circuit. Graphical illustrations of the output voltage of tube 1 at point 15 in the plate circuit are shown in Fig. 3(*a*), (*b*), and (*c*) and illustrations of the voltage at the grid of tube 1 are shown in Fig. 3(*d*). In Fig. 3(*a*) the waveform of the output at point 15 is shown for operation of the multivibrator at a predetermined constant frequency. Fig. 3(*b*) shows the effect of inherent errors in known multivibrators when a change in a component characteristic changes the predetermined frequency. In Fig. 3(*b*), for example, the frequency has increased. In Fig. 3(*b*) there is no degenerative feedback circuit to correct the frequency instability. Figs. 3(*c*) and 3(*d*) show the waveforms of the multivibrator of this invention when the frequency tends to increase. The waveform of Fig. 3(*c*) indicating the voltage at point 15 initially shows the tendency of the multivibrator to increase in frequency of operation. Thus, at the time $T_5$ point 15 falls to an $E_1$ potential with tube 1 conducting and tube 2 cut off. Time $T_5$ is sooner than time $T_1$ indicating an increase in the frequency of operation. During the previous half cycle of operation before time $T_5$ capacitor 13 had less time to discharge because of the increase in frequency of the multivibrator and the bias voltage at point 17 became more positive than normal. Therefore, at time $T_5$ when tube 1 commences conducting the potential at the grid of tube 1 falls negatively at a rate below normal and reaches the switching point at time $T_6$. The time it takes the grid of tube 1 to fall to cutoff, as evidenced by time $T_6$, is increased from the time of the previous cycle because the grid is falling at a decreased rate. Thus, it can be seen that the frequency of the output as shown in Fig. 3(*e*) has been decreased. This decrease continues through times $T_7$, $T_8$, and $T_9$ until the multivibrator is stabilized at the predetermined frequency. Simultaneously a tendency by the multivibrator to decrease in frequency is compensated for by the bias of point 17 of Fig. 1.

It is readily apparent that the compensating action of the degeneratively feedback circuit which produces a bias voltage at point 17 will tend to cause the frequency of the multivibrator to decrease with an increase from normal and to increase with a decrease from normal, thus providing frequency stability.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In an internally frequency controlled multivibrator, a first and second electronic valve each comprising at least an anode, a cathode, and a control element, a source of direct current having a positive and a ground terminal connected to establish operating potentials on the anode, cathode, and control elements of said electronic valves, means coupling the anode and control element circuits of said electronic valves to establish a free-running multivibrator of predetermined frequency, said coupling means comprising a first resistor-capacitor circuit coupling the anode of said first valve to the control element of said second valve and a second resistor-capacitor circuit coupling the anode of said second valve to the control element of said first valve, and means degeneratively coupling the anodes and control elements of said electronic valves to ground to cause said multivibrator to tend to maintain said predetermined frequency, said degeneratively coupling means including a third circuit having a resistor and a capacitor connected in parallel across a pair of terminals, means for connecting one of said terminals to both said control elements, the other said terminal being connected to said ground terminal.

2. In combination, a pair of electronic valves, each said valve having an anode, a grid and a cathode, a source of D.C. having a positive and a ground terminal connected across said anodes and cathodes to provide operating potentials for said valves, a first circuit including a resistor and capacitor connected in series between the anode of one of said valves and the grid of the other said valve, a second circuit including a resistor and capacitor connected in series between the anode of the other said valve and the grid of said one valve, said valves responsive to said first and second circuits to form a multivibrator, and a third circuit including a resistor and a capacitor connected in parallel, and means for connecting third circuit connected in common with said first and second circuits and said ground terminal of said D.C. source.

References Cited in the file of this patent

UNITED STATES PATENTS

| | | |
|---|---|---|
| 2,338,395 | Bartelink | Jan. 4, 1944 |
| 2,465,782 | Bartelink | Mar. 29, 1949 |
| 2,562,171 | Butman | July 31, 1951 |
| 2,645,717 | Massman | July 14, 1953 |
| 2,824,229 | Gratian | Feb. 18, 1958 |

FOREIGN PATENTS

| | | |
|---|---|---|
| 891,910 | France | Mar. 23, 1944 |